US008867500B2

(12) United States Patent
Wentink et al.

(10) Patent No.: US 8,867,500 B2
(45) Date of Patent: Oct. 21, 2014

(54) SYSTEMS AND METHODS FOR REDUCING ACKNOWLEDGMENT MESSAGE OVERHEAD

(75) Inventors: Maarten Menzo Wentink, Breukelen (NL); Albert Van Zelst, Breukelen (NL)

(73) Assignee: QUALCOMM Incorporated, San Diego, CA (US)

( * ) Notice: Subject to any disclaimer, the term of this patent is extended or adjusted under 35 U.S.C. 154(b) by 165 days.

(21) Appl. No.: 13/489,075

(22) Filed: Jun. 5, 2012

(65) Prior Publication Data

US 2013/0142176 A1 Jun. 6, 2013

Related U.S. Application Data

(60) Provisional application No. 61/495,261, filed on Jun. 9, 2011.

(51) Int. Cl.
*H04J 3/00* (2006.01)
*H04W 28/06* (2009.01)
*H04L 1/16* (2006.01)

(52) U.S. Cl.
CPC ............ *H04W 28/065* (2013.01); *H04L 1/1607* (2013.01)
USPC .......................................... 370/336; 370/442

(58) Field of Classification Search
CPC .............. H04W 28/065; H04W 84/12; H04W 72/0446
USPC ......... 370/328–329, 335, 336, 342–343, 345, 370/389, 392, 441–442, 479–480, 498
See application file for complete search history.

(56) References Cited

U.S. PATENT DOCUMENTS

| 7,804,800 | B2 | 9/2010 | Li et al. |
| 8,223,723 | B2 * | 7/2012 | Teo et al. ...................... 370/332 |
| 8,233,457 | B1 * | 7/2012 | Chen et al. .................... 370/332 |
| 8,411,632 | B2 * | 4/2013 | Kneckt et al. ................. 370/329 |
| 8,526,351 | B2 * | 9/2013 | Fischer et al. ................ 370/312 |
| 8,565,133 | B2 * | 10/2013 | Chen et al. ................. 370/310.2 |
| 2006/0078001 | A1 * | 4/2006 | Chandra et al. .............. 370/473 |
| 2006/0248429 | A1 | 11/2006 | Grandhi et al. |
| 2007/0171933 | A1 * | 7/2007 | Sammour et al. ............. 370/447 |
| 2007/0298742 | A1 * | 12/2007 | Ketchum et al. ........... 455/186.1 |
| 2008/0045153 | A1 * | 2/2008 | Surineni et al. ............. 455/63.1 |
| 2010/0002649 | A1 * | 1/2010 | Teo et al. ...................... 370/330 |
| 2010/0271992 | A1 | 10/2010 | Wentink et al. |
| 2010/0329236 | A1 * | 12/2010 | Sampath et al. .............. 370/350 |
| 2011/0002219 | A1 | 1/2011 | Kim et al. |

(Continued)

OTHER PUBLICATIONS

Ashtaiwi, "MIMO-Aware Medium Access Control in IEEE 802.11 Networks," Abduladhim Mabruk Ashtaiwi, Ph.D., Queen's University, Thesis, 2009, 175 pages.

(Continued)

*Primary Examiner* — Kevin Mew
(74) *Attorney, Agent, or Firm* — Kevin T. Cheatham

(57) ABSTRACT

Systems, methods, and devices for reducing the overhead required to transmit acknowledgment messages (ACKs) are described herein. In some aspects, the ACKs are reduced in size. In some aspects the ACKs include several short training fields. In some aspects, a receiver of the ACKs can determine the transmitter of the ACK based on when the ACK is received. In some aspects, a receiver of the ACKs can determine the transmitter of the ACK based on information superimposed on the short training fields in the ACK.

32 Claims, 8 Drawing Sheets

(56) References Cited

U.S. PATENT DOCUMENTS

| | | | |
|---|---|---|---|
| 2011/0044273 A1* | 2/2011 | Maltsev et al. | 370/329 |
| 2011/0044392 A1* | 2/2011 | Maltsev et al. | 375/260 |
| 2011/0150004 A1* | 6/2011 | Denteneer et al. | 370/476 |
| 2012/0127899 A1* | 5/2012 | Ketchum et al. | 370/310 |
| 2012/0269142 A1* | 10/2012 | Porat et al. | 370/329 |

OTHER PUBLICATIONS

Calcev G (HUAWEI): "Considerations on Short Packet Transmission Overhead; 11-11-1254-00-00ah-considerations-on-short-packet-transmission-overhead", IEEE Draft; 11-11-1254-00-00AH-Considerations-On-Short-Packet-Transmission-Overhead, IEEE-SA Mentor, Piscataway, NJ USA, vol . 802.11ah, Sep. 19, 2011, pp. 1-8, XP017673627.

Cariou L., et al., "Short Ack", Jan. 16, 2012, pp. 1-13, XP55036664, Retrieved from the Internet: URL:https://mentor.ieee.org/802.11/.../11-12-0109-00-00ah-short-ack.ppt [retrieved on Aug. 29, 2012] Slide 5.

Dunlop J., et al., "Block Reservation Multiple Access for 3rd Generation Cellular Systems", Universal Personal Communications, 1993. Personal Communications: Gate Way to the 21ST Century. Conference Record., 2ND International Conference on Ottawa, Ont., Canada Oct. 12-15, 1993, New York, NY, USA,IEEE vol. 1, pp. 18-22, XP010198158.

Hoffmann O., et al., "A Link Level Efficiency Measure for Wireless Home Area Networks", Global Telecommunications Conference, 2009. Globecom 2009. IEEE, IEEE, Piscataway, NJ, USA, Nov. 30, 2009, pp. 1-6, XP031645996.

International Search Report and Written Opinion—PCT/US2012/041174—ISA/EPO—Oct. 29, 2012.

Liu Y (Marvell): "Short-ack ; 11-12-0324-02-00ah-short-ack" IEEE Draft; 11-12-0324-02-00AH-Short-Ack, IEEE-SA Mentor, Piscataway, NJ USA, vol. 802.11ah, No. 2, Mar. 14, 2012, pp. 1-15, XP017672405.

Merlin S (Qualcomm Inc): "MAC header compression ; 11-12-0365-01-00ah-mac-header-compression", IEEE Draft; 11-12-0365-01-00AH-MAC-Header-Compression, IEEE-SA Mentor, Piscataway, NJ USA, vol. 802.11 ah, No. 1, Mar. 15, 2012, pp. 1-9, XP017672316, Slides 6 and 8.

Quan Z., et al., "MAC Header Compression", Mar. 14, 2012, XP55041687, Waikoloa, HI, USA Retrieved from the Internet: URL:https://mentor.ieee.org/802.11/dcn/12/11-12-0365-01-00ah-mac-header-compression.pptx [retrieved on Oct. 19, 2012] Slides 3, 4, and 6.

Sun Y., et al., "Goodput Performance of Ultrahigh-speed WLAN via Link Adaptation Algorithm", Communication Technology (ICCT), 2010 12TH IEEE International Conference on, IEEE, Piscataway, NJ, USA, Nov. 11, 2010, pp. 1344-1348, XP031850090.

Wand J., et al., [MediaTek Inc]: "Discussion on 11 ah MAC and PHY Issues and Enhancements", Mar. 13, 2011, XP002682257, Singapore Retrieved from the Internet: URL:https://mentor.ieee.org/802.11/dcn/11/ 11-11-0350-00-00ah-discussion-on-11ah-mac-phy-issues.pptx [retrieved on Aug. 21, 2012].

* cited by examiner

| Field Name | Size in Octets | Field Description |
|---|---|---|
| fc | 2 | frame control |
| dur | 2 | duration |
| a1 | 6 | address 1 |
| fcs | 4 | frame control sequence |
| TOTAL SIZE: | 14 | |

- 305
- 310
- 315
- 320

305 {

| Field Name | Size in Bits | Field Description |
|---|---|---|
| pv | 2 | protocol version |
| type | 2 | frame type |
| subtype | 4 | frame subtype |
| to-ds | 1 | to distribution system |
| from-ds | 1 | from distribution system |
| more frag | 1 | more fragments |
| retry | 1 | retry |
| pm | 1 | power management |
| md | 1 | more data |
| pf | 1 | protected frame |
| order | 1 | order |
| TOTAL SIZE: | 16 | |

FIG. 3

SYSTEMS AND METHODS FOR REDUCING ACKNOWLEDGMENT MESSAGE OVERHEAD

CROSS REFERENCE TO RELATED APPLICATION(S)

This application claims the benefit of U.S. Provisional Application No. 61/495,261, filed Jun. 9, 2011, the entire content of which is incorporated herein by reference

BACKGROUND

1. Field

The present application relates generally to wireless communications, and more specifically to systems, methods, and devices for reducing acknowledgment message (ACK) overhead.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The devices in a wireless network may transmit/receive information between each other. As part of this communication process, a device that receives information from another device may transmit an acknowledgment (ACK) to the device that transmitted the information, the ACK acknowledging the fact it received the information. The act of transmitting an acknowledgment adds additional overhead to communications in the wireless network.

This additional overhead may be especially problematic in some wireless networks. For example, in some areas, such as in Europe, some spectrums (e.g., wireless channels, frequency bands, etc.) have a transmit duty cycle restriction of 100 seconds per hour. That means that a given transmitter is only allowed to transmit in that spectrum for less than 100 seconds in a given hour. In some cases, such as for devices collecting measurements from sensors, the overhead of sending an ACK alone may exceed this duty cycle threshold. Thus, improved systems, methods, and devices for communicating ACKs are desired.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the size of an ACK, thereby reducing the overhead in transmitting ACKs.

One aspect of the disclosure provides a method of communicating in a wireless network. The method comprises receiving a data packet. The method further comprises transmitting an acknowledgment packet in response to receiving the data packet, the acknowledgment packet comprising a plurality of short training fields. The acknowledgment packet acknowledging receipt of the received data packet.

Another aspect of the disclosure provides a method of communicating in a wireless network. The method comprises transmitting a data packet. The method further comprises receiving an acknowledgment packet in response to transmitting the data packet, the acknowledgment packet comprising a plurality of short training fields. The acknowledgment packet acknowledging receipt of the data packet.

Another aspect of the disclosure provides an apparatus for communicating in a wireless network. The apparatus comprises a receiver configured to receive a data packet. The apparatus further comprises a transmitter configured to transmit an acknowledgment packet in response to receiving the data packet, the acknowledgment packet comprising a plurality of short training fields. The acknowledgment packet acknowledging receipt of the received data packet.

Another aspect of the disclosure provides an apparatus for communicating in a wireless network. The apparatus comprises a transmitter configured to transmit a data packet. The apparatus further comprises a receiver configured to receive an acknowledgment packet in response to transmitting the data packet, the acknowledgment packet comprising a plurality of short training fields. The acknowledgment packet acknowledging receipt of the data packet.

Another aspect of the disclosure provides an apparatus for communicating in a wireless network. The apparatus comprises means for receiving a data packet. The apparatus further comprises means for transmitting an acknowledgment packet in response to receiving the data packet, the acknowledgment packet comprising a plurality of short training fields. The acknowledgment packet acknowledging receipt of the received data packet.

Another aspect of the disclosure provides an apparatus for communicating in a wireless network. The apparatus comprises means for transmitting a data packet. The apparatus further comprises means for receiving an acknowledgment packet in response to transmitting the data packet, the acknowledgment packet comprising a plurality of short training fields. The acknowledgment packet acknowledging receipt of the data packet.

Another aspect of the disclosure provides a computer readable medium comprising instructions. The instructions when executed cause an apparatus to receive a data packet. The instructions when executed further cause the apparatus to transmit an acknowledgment packet in response to receiving the data packet, the acknowledgment packet comprising a plurality of short training fields. The acknowledgment packet acknowledging receipt of the received data packet.

Another aspect of the disclosure provides a computer readable medium comprising instructions. The instructions when executed cause an apparatus to transmit a data packet. The instructions when executed further cause the apparatus to receive an acknowledgment packet in response to transmitting the data packet, the acknowledgment packet comprising a plurality of short training fields. The acknowledgment packet acknowledging receipt of the data packet.

BRIEF DESCRIPTION OF THE DRAWINGS

FIG. 3 illustrates an example of an acknowledgment (ACK) of a type used in certain systems for communication.

DETAILED DESCRIPTION

Figure 1:
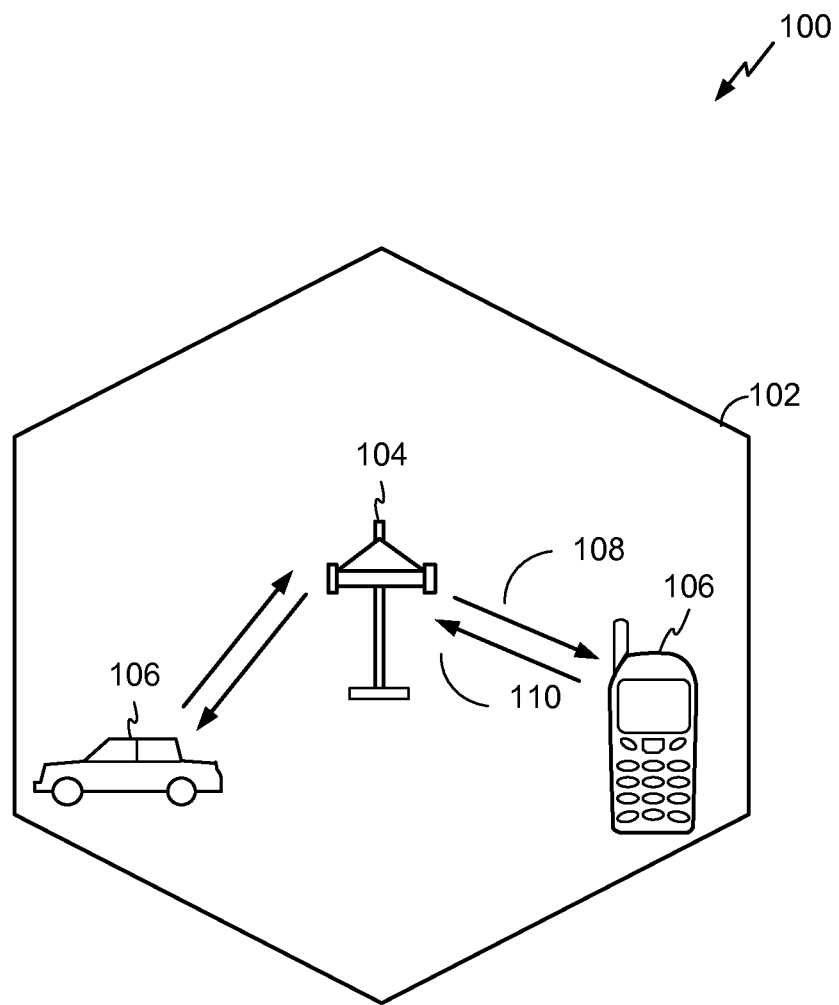
FIG. 1 illustrates an example of a wireless communication system in which aspects of the present disclosure may be employed.

Various aspects of the novel systems, apparatuses, and methods are described more fully hereinafter with reference to the accompanying drawings. The teachings of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof Popular wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes. Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
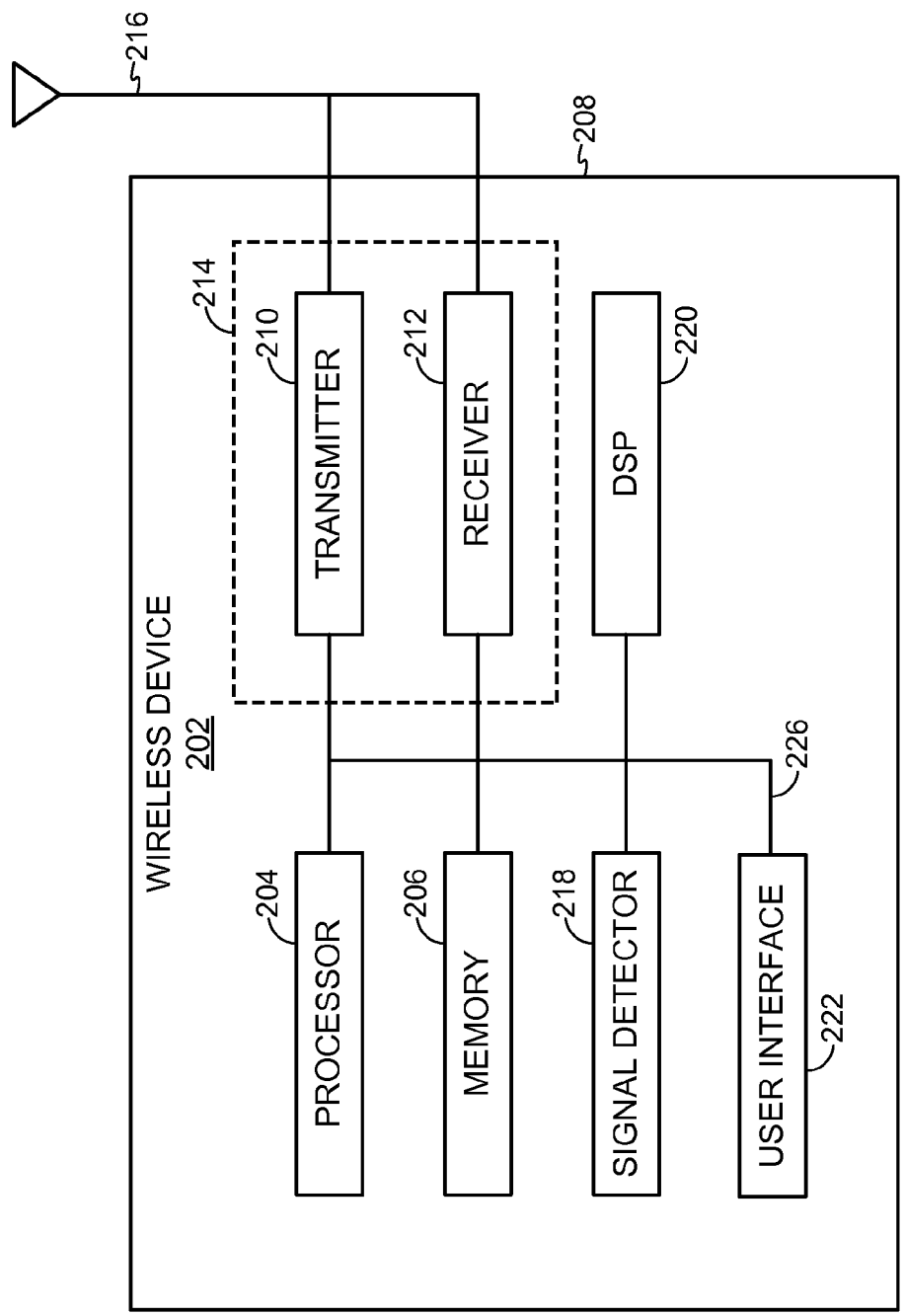
FIG. 2 illustrates various components, including a receiver, that may be utilized in a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to generate a data packet for transmission to a receiving node. The processor 204 may further be configured to process an ACK as discussed below if the transmitting node receives an ACK from another device, the ACK being transmitted in response to reception of a data packet.

When the wireless device 202 is implemented or used as a receiving node, the processor 204 may be configured to process data packets received from a transmitting node. The processor 204 may further be configured to generate an ACK as discussed below to transmit to the transmitting node based on reception of the data packets.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets and/or ACKs. The receiver 212 may be configured to wirelessly receive packets and/or ACKs.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or an STA 106, and may be used to transmit and/or receive communications including ACKs.

FIG. 3 illustrates an example of an ACK 300, of a type used in certain systems for communication. For example, the ACK 300 includes 4 fields: a frame control (fc) field 305, a duration/identification (dur) field 310, a receiver address (a1) field 315, and a frame control sequence (fcs) field 320. The ACK 300 may be transmitted by a wireless device 202r to a wireless device 202t after the wireless device 202r receives a data packet transmitted from the wireless device 202t. The ACK 300 indicates to the wireless device 202t that the wireless device 202r received the data packet. The wireless device 202t can therefore verify transmission of the data packet to the wireless device 202r. The wireless device 202t can determine that the ACK 300 is from the wireless device 202r based on the a1 field 315 which indicates the address of the wireless device 202r.

In some situations, the time needed to transmit the entire ACK 300 from the wireless device 202r to the wireless device 202t may be prohibitive as it creates too much overhead. For example, as discussed above, in some areas, such as in Europe, some spectrums (e.g., wireless channels, frequency bands, etc.) have a transmit duty cycle restriction of 100 seconds per hour. That means that a given transmitter is only allowed to transmit in that spectrum for no more than 100 seconds in a given hour. In some cases, such as for devices collecting measurements from sensors, the overhead of sending an ACK alone may exceed this duty cycle threshold. Therefore, transmission of the entire ACK 300 from the wireless device 202r to the wireless device 202t may not be feasible.

Accordingly, systems and methods for using ACKs of reduced size (short ACKs) are described herein. Such short ACKs may not include a physical layer (PHY), a media access control (MAC) header, and/or additional padding to reduce their size. The use of such short ACKs allows for less data to be included in an ACK, thereby reducing the overhead needed to transmit the ACK. Thus, less data needs to be transmitted overall. Less transmission of data can increase the speed with which data is transmitted, can reduce the use of bandwidth by a transmitter, and can reduce the power needed for transmission as fewer resources are used to transmit less data.

Figure 4:
FIG. 4 illustrates an example of a short ACK that may be used in the wireless communication system of FIG. 1.

FIG. 4 illustrates an example of a short ACK 400 that may be used in the wireless communication system 100 of FIG. 1. As shown, the ACK 400 comprises several short training fields (STFs) 405. In some aspects an STF 405 includes a plurality of repeated training sequences. As is known in the art, an STF in a data packet (including an ACK packet) can be used to detect the beginning of a packet. The duration of the ACK 400 is defined to be less than the duration of the ACK 300 of FIG. 3, thus requiring less overhead to transmit than the ACK 300. In some embodiments, the ACK 400 may have a duration that is less than a symbol time used in the wireless communication system 100.

The ACK 400 may be transmitted by the wireless device 202r after it receives an incoming data packet from the wireless device 202t. Before sending the ACK 400 and after receiving the incoming data packet, the wireless device 202r may further decode the data packet and check to see if a frame control sequence (e.g., a cyclic redundancy check) of the data packet passes; indicating that there are no errors in the reception of the data packet. The time interval between transmitting the data packet at the wireless device 202t and transmitting the ACK 400 at the wireless device 202r may be referred to as a turnaround inter-frame space (TIFS). The TIFS value may be a predefined value known by both the wireless device 202t and the wireless device 202r. In some aspects, the TIFS value may vary or be different per pair of wireless devices communicating and thereby provide an indication of the device that transmitted the ACK 400. For example, for a given pair of wireless devices 202, the TIFS may be selected from a set of values, e.g., 4 values, such as, 10, 15, 20 and 25 us. In such an example, assuming an air propagation delay of a maximum of 1 us, the time at which the ACK 400 is received is between 10-12 us, 15-17 us, 20-22 us, and 25-27 us, depending on the TIFS value selected. If different pairs of wireless devices 202 select different TIFS values, the time at which the ACK 400 is received can be used to determine which wireless device 202r transmitted the ACK, as it would be one of the devices of the pair of wireless devices 202 with a TIFS value that corresponds to the time at which the ACK 400 is received. In some aspects, the value for TIFS may be selected based on the contents of the data frame to which the ACK 400 is the response. TIFS may for instance be based on a scrambler seed in the data packet or on the frame control sequence (FCS) of the data packet.

The wireless device 202t receiving the ACK 400 from the wireless device 202r may then determine that the wireless device 202r sent the ACK 400. The wireless device 202t may not be able to make the determination of the sender of the ACK 400 in the same manner as it would for an ACK 300. For example, as discussed above, the ACK 300 includes the a1 field 315, which indicates the sender of the ACK 300. The ACK 400 has no such field. However, the wireless device 202t does have information as to when the initial data packet is transmitted, and when the ACK 400 is received. Accordingly, if the ACK 400 is received after a TIFS after a data packet is transmitted to the wireless device 202r, the wireless device 202t can assume the ACK 400 is sent from the wireless device 202r. In some embodiments, information may be superimposed on the STFs 405 in the ACK 400 to indicate it is an ACK to help the wireless device 202t make the determination ACK 400 is from the wireless device 202r. In some embodiments, information may be superimposed on the STFs 405 in the ACK 400 to indicate part or all of the address of the wireless device 202r to help the wireless device 202t make the determination the ACK 400 is from the wireless device 202r. In some aspects, the STF sequence may be changed to superimpose information on the STFs 405 in the ACK 400. In other aspects, the information may be superimposed by changing the phase of some or all of the STFs 405 in ACK 400. In some aspects, the interframe space may provide an indication to help the wireless device 202t make the determination the ACK 400 is from the wireless device 202r.

Figure 5:
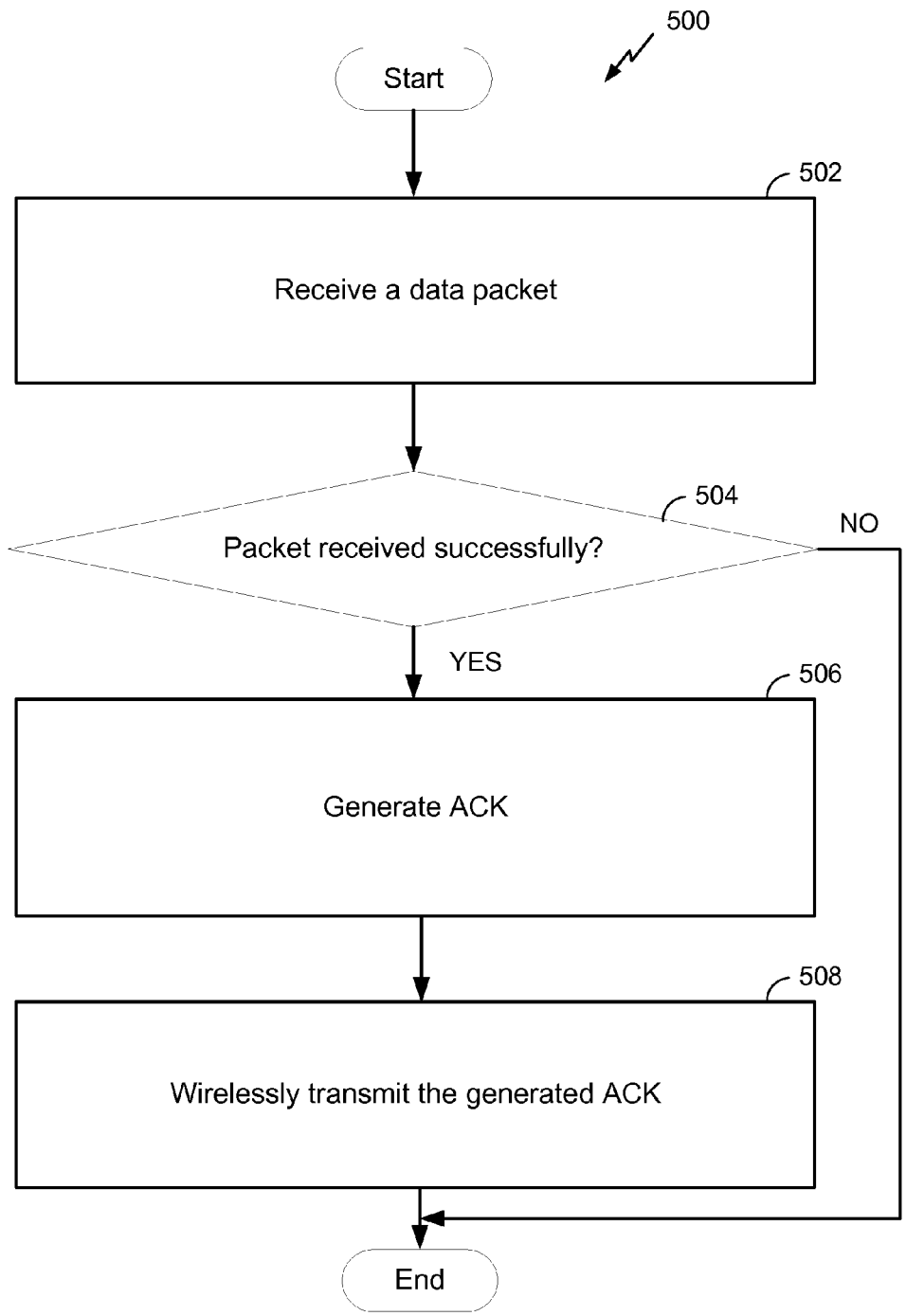
FIG. 5 illustrates an aspect of a method for transmitting an ACK.

FIG. 5 illustrates an aspect of a method 500 for transmitting an ACK. The method 500 may be used to generate the ACK 400 illustrated in FIG. 4, or another suitable ACK based on the teachings herein. The ACK 400 may be generated at either the AP 104 or the STA 106 and transmitted to another node in the wireless network 100. Although the method 500 is described below with respect to elements of the wireless device 202r, those having ordinary skill in the art will appreciate that other components may be used to implement one or more of the steps described herein.

At a block 502, a data packet is received at the wireless device 202r from the wireless device 202t. The reception may be performed by the receiver 212, for example.

At a block 504, the wireless device 202r determines whether the data packet is received successfully. For example, the wireless device 202r may check if a frame control sequence of the data packet passes. If the data packet is not received successfully, the method 500 ends. If the data packet is received successfully, the method continues to a block 506. The determination may be performed by the processor 204 and/or the DSP 220, for example.

At block 506, the ACK 400 is generated. As discussed above, the ACK 400 includes several STFs 405. In some embodiments, information may be superimposed on the STFs 405 in the ACK 400 to indicate it is an ACK. In some embodiments, information may be superimposed on the STFs 405 in the ACK 400 to indicate part or all of the address of the wireless device 202r. The generation may be performed by the processor 204 and/or the DSP 220, for example.

Further, at block 508, the ACK 400 is transmitted to the wireless device 202t. The ACK 400 may be transmitted after a TIFS from when the data packet is received from the wireless device 202t at the block 502. The transmission may be performed by the transmitter 210, for example.

Figure 6:
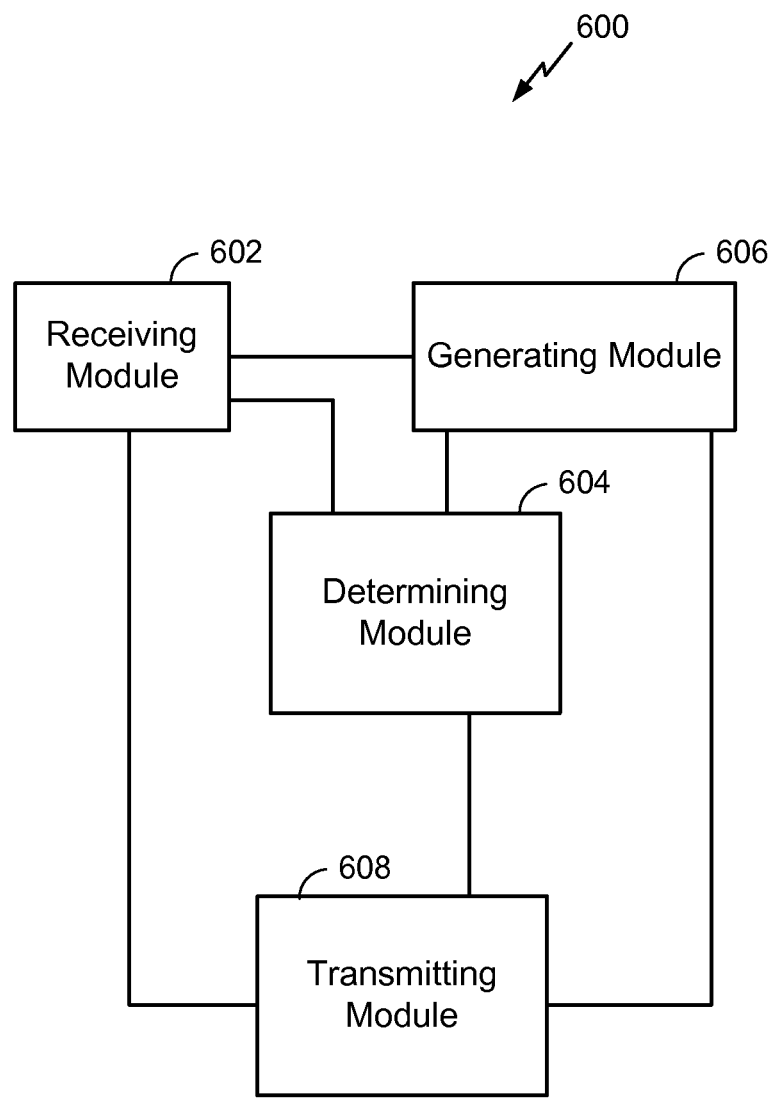
FIG. 6 is a functional block diagram of another exemplary wireless device that may be employed within the wireless communication system of FIG. 1.

FIG. 6 is a functional block diagram of another exemplary wireless device 600 that may be employed within the wireless communication system 100. The device 600 comprises a receiving module 602 for receiving a data packet from another wireless device, as discussed above. The receiving module 602 may be configured to perform one or more of the functions discussed above with respect to the block 502 illustrated in FIG. 5. The receiving module 602 may correspond to the receiver 212. The device 600 further comprises a determining module 604 for determining whether the data packet is received successfully. The determining module 604 may be configured to perform one or more of the functions discussed above with respect to the block 504 illustrated in FIG. 5. The determining module 604 may correspond to one or more of the processor 204 and the DSP 220. The device 600 further comprises a generating module 606 for generating the ACK. The generating module 606 may be configured to perform one or more of the functions discussed above with respect to the block 506 illustrated in FIG. 5. The generating module 606 may correspond to one or more of the processor 204 and the DSP 220. The device 600 further comprises a transmitting module 608 for transmitting the ACK frame. The transmitting module 608 may be configured to perform one or more of the functions discussed above with respect to the block 508 illustrated in FIG. 5. The transmitting module 608 may correspond to the transmitter 210.

Figure 7:
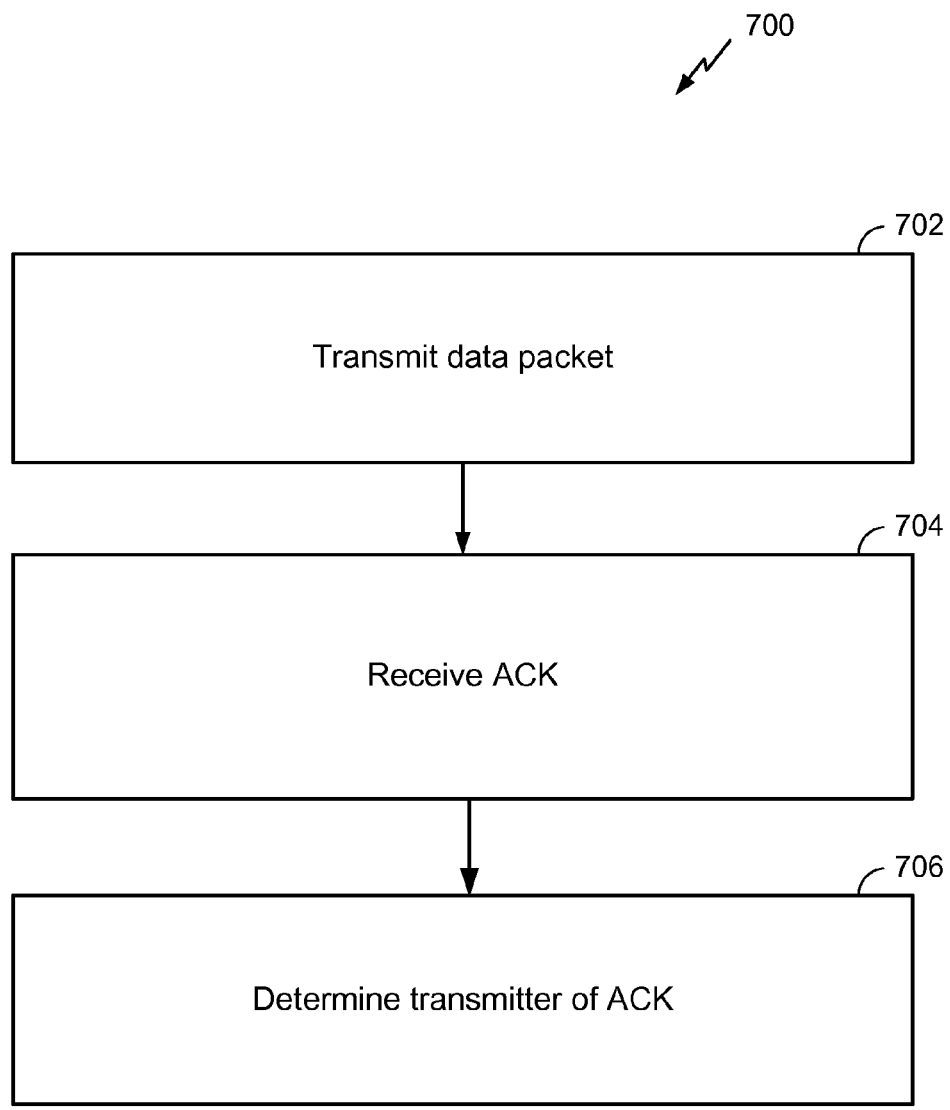
FIG. 7 illustrates an aspect of a method for receiving and processing an ACK.

FIG. 7 illustrates an aspect of a method 700 for receiving and processing an ACK. The method 700 may be used to receive and process the ACK 400 illustrated in FIG. 4, or another suitable ACK based on the teachings herein. The ACK frame may be received at either the AP 104 or the STA 106 from another node in the wireless network 100. Although the method 700 is described below with respect to elements of the wireless device 202t, those having ordinary skill in the art will appreciate that other components may be used to implement one or more of the steps described herein.

At block 702, a data packet is transmitted by the wireless device 202t to the wireless device 202r. The transmission may be performed by the transmitter 210, for example At a block 704, an ACK 400 having a plurality of STFs is wirelessly received. The reception may be performed by the receiver 212, for example. At block 706, the wireless device 202t determines whether the ACK 400 is transmitted by the wireless device 202r in response to reception of the data packet transmitted. The determining may be performed by the processor 204 and/or the DSP 220, for example. In one embodiment, the determining may comprise determining whether the ACK 400 is received after a TIFS from when the data packet is transmitted by the wireless device 202t at the block 702, which indicates the wireless device 202r is the transmitter of the ACK 400. In another embodiment, the determining may comprise reading information superimposed on the plurality of STFs that indicate the wireless device 202r is the transmitter of the ACK 400.

Figure 8:
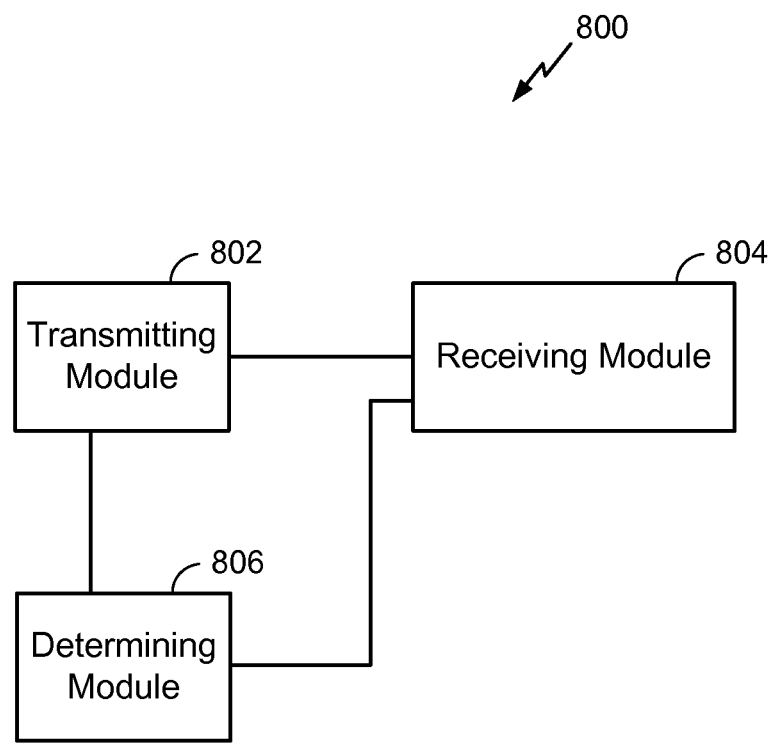
FIG. 8 is a functional block diagram of another exemplary wireless device that may be employed within the wireless communication system of FIG. 1.

FIG. 8 is a functional block diagram of another exemplary wireless device 800 that may be employed within the wireless communication system 100. The device 800 comprises a transmitting module 802 for wirelessly transmitting a packet to another wireless device. The transmitting module 802 may be configured to perform one or more of the functions discussed above with respect to the block 702 illustrated in FIG. 7. The transmitting module 802 may correspond to the transmitter 210, for example. The device 800 further comprises a receiving module 804 for wirelessly receiving an ACK from another wireless device. The receiving module 804 may be configured to perform one or more of the functions discussed above with respect to the block 704 illustrated in FIG. 7. The receiving module 804 may correspond to the receiver 212, for example. The device 800 further comprises a determining module 806 for determining whether the ACK is transmitted by the other wireless device in response to reception of the data packet transmitted. The determining module 806 may be configured to perform one or more of the functions discussed above with respect to the block 706 illustrated in FIG. 7. The determining module 806 may correspond to the processor 204 and/or the DSP 220, for example.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of communicating in a wireless network, the method comprising:
   receiving a data packet;
   superimposing data over a plurality of short training fields comprising an acknowledgment packet, the data indicating a transmitter of the acknowledgment packet over the plurality of short training fields; and
   transmitting the acknowledgment packet in response to receiving the data packet, the acknowledgment packet acknowledging receipt of the received data packet.

2. A method of communicating in a wireless network, the method comprising:
   receiving a data packet;
   superimposing data over a plurality of short training fields comprising an acknowledgment packet, the data indicating the acknowledgment packet is of an acknowledgment type over the plurality of short training fields; and
   transmitting the acknowledgment packet in response to receiving the data packet, the acknowledgment packet acknowledging receipt of the received data packet.

3. The method of claim 1, wherein the acknowledgment packet consists of the plurality of short training fields.

4. A method of communicating in a wireless network, the method comprising:
   transmitting a data packet;
   receiving an acknowledgment packet in response to transmitting the data packet, the acknowledgment packet comprising a plurality of short training fields, the acknowledgment packet acknowledging receipt of the data packet; and determining an identity of a transmitter of the acknowledgment packet based on a time interval between transmission of the data packet and reception of the acknowledgment packet.

5. The method of claim 4, wherein the time interval comprises a turnaround inter-frame space.

6. A method of communicating in a wireless network, the method comprising:
   transmitting a data packet;
   receiving an acknowledgment packet in response to transmitting the data packet, the acknowledgment packet comprising a plurality of short training fields, the acknowledgment packet acknowledging receipt of the data packet; and
   determining an identity of a transmitter of the acknowledgment packet based on information superimposed over the plurality of short training fields.

7. A method of communicating in a wireless network, the method comprising:
   transmitting a data packet;
   receiving an acknowledgment packet in response to transmitting the data packet, the acknowledgment packet comprising a plurality of short training fields, the acknowledgment packet acknowledging receipt of the data packet; and
   determining the acknowledgment packet is of an acknowledgment type based on information superimposed over the plurality of short training fields.

8. The method of claim 4, wherein the acknowledgment packet consists of the plurality of short training fields.

9. An apparatus for communicating in a wireless network, the apparatus comprising:
   a receiver configured to receive a data packet;
   a processor configured to superimpose data over a plurality of short training fields comprising an acknowledgment packet, the data indicating an identity of the apparatus over the plurality of short training fields; and
   a transmitter configured to transmit the acknowledgment packet in response to receiving the data packet, the acknowledgment packet acknowledging receipt of the received data packet.

10. An apparatus for communicating in a wireless network, the apparatus comprising:
    a receiver configured to receive a data packet;
    a processor configured to superimpose data over a plurality of short training fields comprising an acknowledgment packet, the data indicating the acknowledgment packet is of an acknowledgment type over the plurality of short training fields; and
    a transmitter configured to transmit the acknowledgment packet in response to receiving the data packet, the acknowledgment packet acknowledging receipt of the received data packet.

11. The apparatus of claim 9, wherein the acknowledgment packet consists of the plurality of short training fields.

12. An apparatus for communicating in a wireless network, the apparatus comprising:
    a transmitter configured to transmit a data packet;
    a receiver configured to receive an acknowledgment packet in response to transmitting the data packet, the acknowledgment packet comprising a plurality of short training fields, the acknowledgment packet acknowledging receipt of the data packet; and
    a processor configured to determine an identity of a device that transmitted the acknowledgment packet based on a time interval between transmission of the data packet and reception of the acknowledgment packet.

13. The apparatus of claim 12, wherein the time interval comprises a turnaround inter-frame space.

14. An apparatus for communicating in a wireless network, the apparatus comprising:
    a transmitter configured to transmit a data packet;
    a receiver configured to receive an acknowledgment packet in response to transmitting the data packet, the acknowledgment packet comprising a plurality of short training fields, the acknowledgment packet acknowledging receipt of the data packet; and
    a processor configured to determine an identity of a device that transmitted the acknowledgment packet based on information superimposed over the plurality of short training fields.

15. An apparatus for communicating in a wireless network, the apparatus comprising:
    a transmitter configured to transmit a data packet;
    a receiver configured to receive an acknowledgment packet in response to transmitting the data packet, the acknowledgment packet comprising a plurality of short training fields, the acknowledgment packet acknowledging receipt of the data packet; and
    a processor configured to determine the acknowledgment packet is of an acknowledgment type based on information superimposed over the plurality of short training fields.

16. The apparatus of claim 12, wherein the acknowledgment packet consists of the plurality of short training fields.

17. An apparatus for communicating in a wireless network, the apparatus comprising:
    means for receiving a data packet;
    means for superimposing data over a plurality of short training fields comprising an acknowledgment packet, the data indicating a transmitter of the acknowledgment packet over the plurality of short training fields; and
    means for transmitting the acknowledgment packet in response to receiving the data packet, the acknowledgment packet acknowledging receipt of the received data packet.

18. An apparatus for communicating in a wireless network, the apparatus comprising:
    means for receiving a data packet;
    means for superimposing data over a plurality of short training fields comprising an acknowledgment packet, the data indicating the acknowledgment packet is of an acknowledgment type over the plurality of short training fields; and
    means for transmitting the acknowledgment packet in response to receiving the data packet, the acknowledgment packet acknowledging receipt of the received data packet.

19. The apparatus of claim 17, wherein the acknowledgment packet consists of the plurality of short training fields.

20. An apparatus for communicating in a wireless network, the apparatus comprising:
    means for transmitting a data packet;
    means for receiving an acknowledgment packet in response to transmitting the data packet, the acknowledgment packet comprising a plurality of short training fields, the acknowledgment packet acknowledging receipt of the data packet; and
    means for determining an identity of a transmitter of the acknowledgment packet based on a time interval between transmission of the data packet and reception of the acknowledgment packet.

21. The apparatus of claim 20, wherein the time interval comprises a turnaround inter-frame space.

22. An apparatus for communicating in a wireless network, the apparatus comprising:
   means for transmitting a data packet;
   means for receiving an acknowledgment packet in response to transmitting the data packet, the acknowledgment packet comprising a plurality of short training fields, the acknowledgment packet acknowledging receipt of the data packet; and
   means for determining an identity of a transmitter of the acknowledgment packet based on information superimposed over the plurality of short training fields.

23. An apparatus for communicating in a wireless network, the apparatus comprising:
   means for transmitting a data packet;
   means for receiving an acknowledgment packet in response to transmitting the data packet, the acknowledgment packet comprising a plurality of short training fields, the acknowledgment packet acknowledging receipt of the data packet; and
   means for determining the acknowledgment packet is of an acknowledgment type based on information superimposed over the plurality of short training fields.

24. The apparatus of claim 20, wherein the acknowledgment packet consists of the plurality of short training fields.

25. A non-transitory computer readable medium comprising instructions that when executed cause an apparatus to:
   receive a data packet;
   superimpose data over a plurality of short training fields comprising an acknowledgment packet, the data indicating a transmitter of the acknowledgment packet over the plurality of short training fields; and
   transmit the acknowledgment packet in response to receiving the data packet, the acknowledgment packet acknowledging receipt of the received data packet.

26. A non-transitory computer readable medium comprising instructions that when executed cause an apparatus to:
   receive a data packet;
   superimpose data over a plurality of short training fields comprising an acknowledgment packet, the data indicating the acknowledgment packet is of an acknowledgment type over the plurality of short training fields; and
   transmit the acknowledgment packet in response to receiving the data packet, the acknowledgment packet acknowledging receipt of the received data packet.

27. The computer readable medium of claim 25, wherein the acknowledgment packet consists of the plurality of short training fields.

28. A non-transitory computer readable medium comprising instructions that when executed cause an apparatus to:
   transmit a data packet;
   receive an acknowledgment packet in response to transmitting the data packet, the acknowledgment packet comprising a plurality of short training fields, the acknowledgment packet acknowledging receipt of the data packet; and
   determine an identity of a transmitter of the acknowledgment packet based on a time interval between transmission of the data packet and reception of the acknowledgment packet.

29. The computer readable medium of claim 28, wherein the time interval comprises a turnaround inter-frame space.

30. A non-transitory computer readable medium comprising instructions that when executed cause an apparatus to:
   transmit a data packet;
   receive an acknowledgment packet in response to transmitting the data packet, the acknowledgment packet comprising a plurality of short training fields, the acknowledgment packet acknowledging receipt of the data packet; and
   determine an identity of a transmitter of the acknowledgment packet based on information superimposed over the plurality of short training fields.

31. A non-transitory computer readable medium comprising instructions that when executed cause an apparatus to:
   transmit a data packet;
   receive an acknowledgment packet in response to transmitting the data packet, the acknowledgment packet comprising a plurality of short training fields, the acknowledgment packet acknowledging receipt of the data packet; and
   determine the acknowledgment packet is of an acknowledgment type based on information superimposed over the plurality of short training fields.

32. The computer readable medium of claim 28, wherein the acknowledgment packet consists of the plurality of short training fields.

* * * * *